United States Patent [19]

Camerik

[11] Patent Number: 4,783,777
[45] Date of Patent: Nov. 8, 1988

[54] DISC PLAYER

[75] Inventor: Eduard Camerik, Eindhoven, Netherlands

[73] Assignee: U.S. Philips Corporation, New York, N.Y.

[21] Appl. No.: 945,062

[22] Filed: Dec. 19, 1986

[30] Foreign Application Priority Data

Dec. 20, 1985 [NL] Netherlands .......................... 8503522

[51] Int. Cl.⁴ .............................................. G11B 25/04
[52] U.S. Cl. ...................................... 369/265; 369/197
[58] Field of Search ............... 369/263, 264, 265, 266, 369/195, 197, 199

[56] References Cited

U.S. PATENT DOCUMENTS

| | | | |
|---|---|---|---|
| 2,837,338 | 6/1958 | Andress | 369/195 |
| 2,944,826 | 7/1960 | Van Essen | 369/195 |
| 4,218,065 | 8/1980 | Van der Hoek et al. | 369/266 |
| 4,575,836 | 3/1986 | Seto | 369/263 |

FOREIGN PATENT DOCUMENTS 403353 10/1932 United Kingdom ................ 369/197

Primary Examiner—Steven L. Stephan
Attorney, Agent, or Firm—F. Brice Faller

[57] ABSTRACT

A disc player comprising two drivable turntables (14, 19) on a common supporting member (4) which can be swung about a swing axis between a first position in which a disc supported by one turntable will be in a play position opposite to a clamping member (21) and a second position in which a disc supported by the other turntable will be in the play position opposite to the recording member. The two turntables are coupled for their drive to the same motor (11) supported by the supporting member, the supporting member being swingable through 180 between the first position and the second position.

7 Claims, 2 Drawing Sheets

DISC PLAYER

BACKGROUND OF THE INVENTION

The invention relates to a disc player comprising two drivable turntables for supporting discs. The turntables are provided on a common supporting member which can be swung about a swing axis between a first position in which a disc supported by one turntable will be in a play position and a second position in which a disc supported by the other turntable will be in the play position.

Such a disc player is known from British Patent Specification No. 2,137,797. When such a disc player is used, various types of discs can be played using the same disc player, for example, discs having video information or discs having audio information, in which for each of the two types of disc a suitable turntable can be accommodated in a position suitable for playing.

In the construction known from British Patent Specification No. 2,137,797 each turntable is connected to the outgoing shaft of an individual driving motor and the two driving motors are connected at a distance from each other to the common supporting member in such a manner that the axes of rotation of the motors enclose an angle with each other. The supporting member can be swung over a corresponding angle between two positions in which in one position the axis of rotation of one motor is vertical and in the other position the axis of rotation of the other motor is vertical. The use of two driving motors for the two turntables is expensive, while the weight of the disc player is also comparatively large when several motors are used and in addition comparatively much space will be necessary for accommodating the two motors supported by the supporting member as a result of which the disc player becomes unnecessarily bulky.

SUMMARY OF THE INVENTION

According to the invention both turntables are coupled to the same motor supported by the supporting member, the supporting member being swingable between the first position and the second position.

Only one motor may be used for driving the two turntables, which motor can be united with the supporting member and the turntables to form a compact unit which can be adjusted, for example, over 180° so that a simple and lightweight construction of the disc player can be achieved.

The accompanying figures are diagrammatic views in which only those components of the disc player are shown which are necessary for a good understanding of the invention. For the further conventional construction of such disc players reference may be made, example, to British Patent Specification No. 2,137,797 or U.S. Pat. No. 4,218,065 (herewith incorporated by reference).

DETAILED DESCRIPTION OF THE PREFERRED EMBODIMENT

Figure 1:
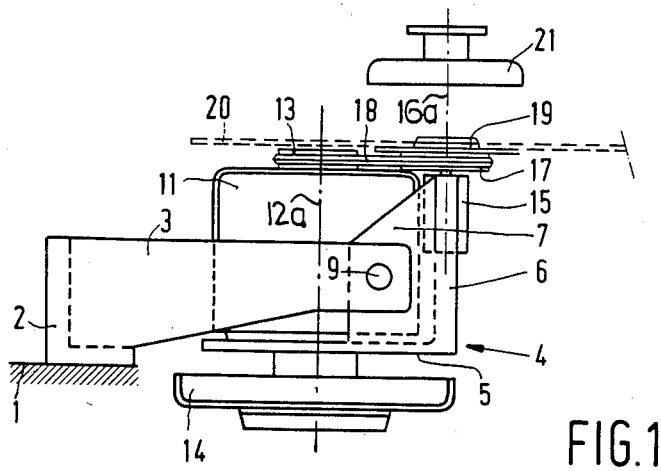
FIG. 1 is a side elevation of a first embodiment of the motor which can be swung about a swing axis and having two turntables connected to said motor.

A support 2 which comprises two arms 3 extenidng parallel to each other is connected to a housing 1 of a disc player shown diagrammatically only in FIG. 1. Between the arms a supporting member 4 is present which comprises a first plate-shaped part 5 an edge of which is adjoined by a plate-shaped part 6 which extends at right angles to the plate-shaped part 5. The connection between the two plate-shaped parts 5 and 6 is reinforced by means of two plate-shaped flanges 7 and 8 which extend at right angles to the sides of the plate-shaped part 6 and which also extend at right angles to the plate-shaped part 5.

The supporting member 4 is coupled to the support 2 so as to be swingable by means of pins 9 and 10 which are in the elongation of each other and which are threaded through holes provided in the arms 3 and in the flanges 7 and 8.

An electric motor 11 mounted on the supporting member 4 bears on the plate 5. The motor 11 has a shaft 12 which projects beyond the housing of the motor 11 at each end. A pulley 13 is connected to the end of the shaft 12 which, viewed in FIG. 1, is the top end. At the end of the shaft 12 extending below the plate 5 of the support 4 a first turntable 14 known per se is connected for supporting a disc carrying video information, a so-called video disc. The first turntable 14 has a first axis of rotation 12a which corresponds to the shaft 12.

A sleeve 15 is connected to the plate-shaped part 6 of the support 4, in which sleeve a shaft 16 is journalled so as to be freely rotatable. The shaft 16 extends parallel to the shaft 12. At the end of the shaft 16 extending above the sleeve 15 a pulley 17 is connected which is coupled to the pulley 13 by means of a belt 18.

A second turntable 19 is connected above the pulley 17 to the shaft 16, which turntable 19 has a conventional construction for receiving a disc carrying audio information, for example a so-called compact disc. The second turntable 19 has a second axis of rotation 16a which corresponds to the shaft 16.

Figure 2:
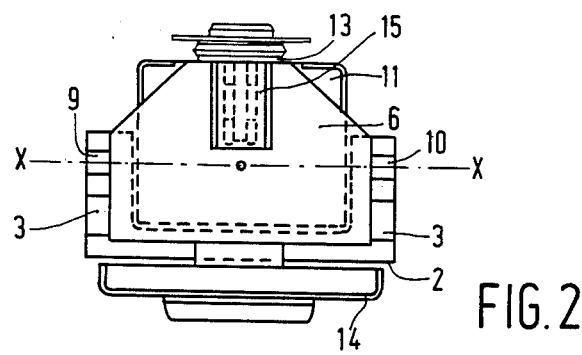
FIG. 2 is a side elevation of FIG. 1.
Figure 3:
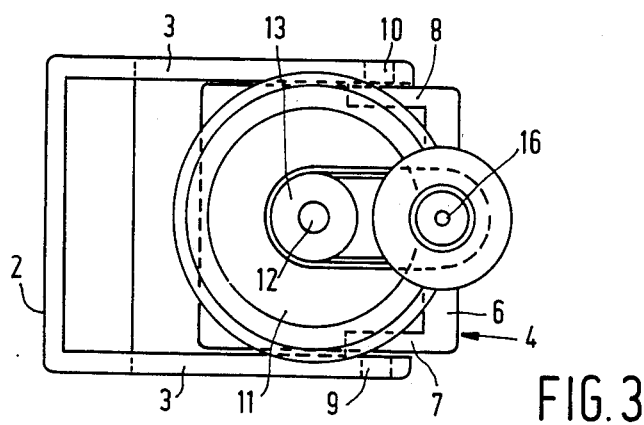
FIG. 3 is a plan view of FIG. 1.

As will become apparent furthermore from FIG. 2 the swing axis X-X formed by the centre lines of the pins 9 and 10 situated in the elongation of each other, about which axis the support 4 with the parts supported by the support 4 can be rotated with respect to the support 2, viewed in the longitudinal direction of the swing axis, is situated centrally between the axes of rotation 12a and 16a.

Figure 4:
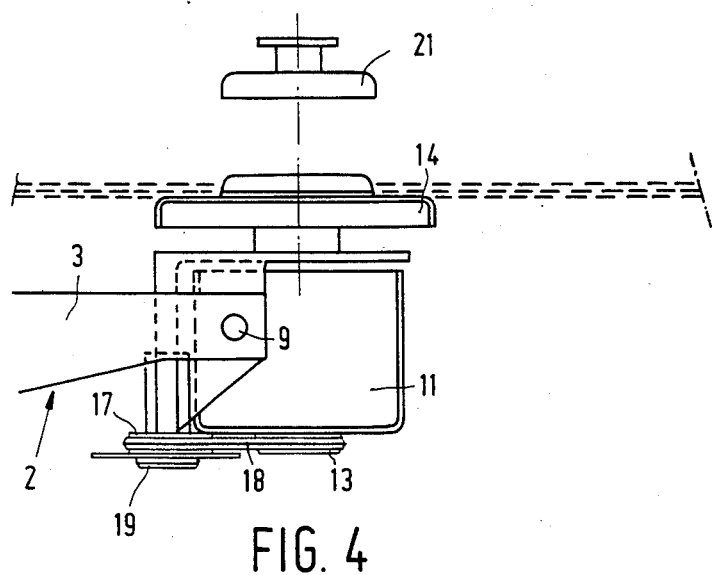
FIG. 4 is a side elevation corresponding to FIG. 1 in which the motor with the turntables has been swung through 180° about the swing axis from the position shown in FIG. 1.

As a result of this arrangement, when the supporting member 4 is rotated from the operating condition shown in FIG. 1 to the operating condition shown in FIG. 4, the axis of rotation of the shaft 12 and hence the axis of rotation 12a of the turntable 14 will assume the position previously occupied by the axis of rotation of the shaft 16 and hence in the position occupied by the axis of rotation 16a of the turntable 19. When the swing axis is also situated exactly between the engaging surfaces of the turntables, it is also achieved that the engaging surfaces are situated in the respective operating conditions in the same level plane.

A disc 20 shown diagrammatically and present in FIG. 1 on the turntable 19 will hence assume the same position with respect to components of the disc player which are important for playing the disc—for example, the pick-up member or the clamping member 21 with which the disc is clamped on the turntable—as a disc 20 which is supported by the turntable 14 if this has been moved to the position shown in FIG. 4.

It is to be noted that by a suitable choice of the diameters of the two pulleys 13 and 17 as is frequently desired, it may be effected that the turntable 19 during operation is driven at a speed which differs from the speed at which the turntable 14 is driven.

Of course, completions and/or changes to the abovedescribed embodiment of the construction according to the invention as shown in the preceding figures are feasible without departing from the spirit and the scope of protection of the invention.

Figure 5:
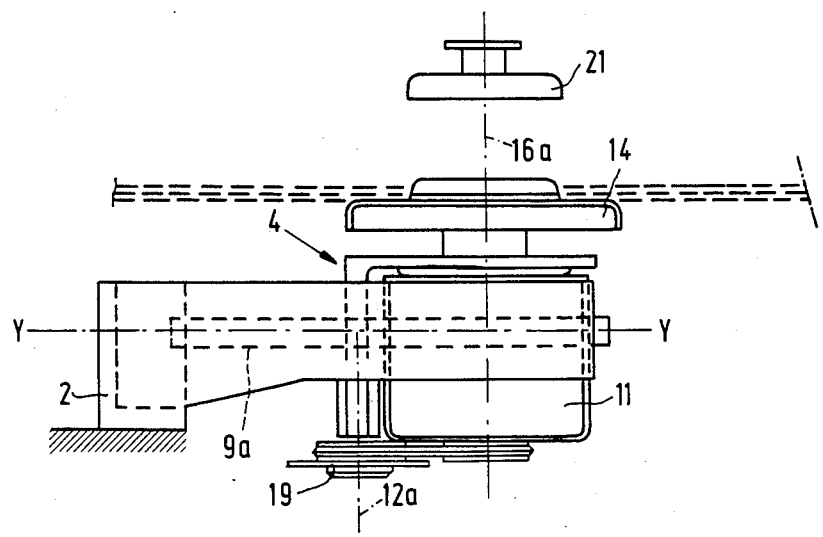
FIG. 5 is a side elevation of the second embodiment of the swingable motor according to the invention.

For example, it is possible, as is shown diagrammatically in FIG. 5, to connect the supporting member 4 with the components supported by said supporting member to the support 2 by means of a swing axis which extends at right angles to the swing axis formed by the pins 9 and 10 and at right angles to the axes of rotation 12a and 16a of the shaft 12 and 16 instead of with the swing axis formed by the pins 9 and 10 shown in FIG. 1. Swinging 180° about such a swing axis does not put the axis of rotation of one shaft in the place of the axis of rotation of the other shaft. In order to be able to nevertheless accomplish this, the supporting member 4 may be connected to the support 2 in such a manner that the supporting member 4, shown in FIG. 5, is movable with respect to the support 2 in a horizontal direction over a distance which is equal to the centre distance between the two shafts 12 and 16.

For that purpose, for example, the support 2 may comprise a long pin 9a which is provided centrally between the arms 3 of the support 2 and extends parallel thereto. The supporting member 4 with the motor 11 is connected by means of a construction suitable for this purpose to the pin 9a in such a manner that both a swinging movement and a sliding movement along the swing axis Y-Y are possible.

Such a movement possibility may be omitted when a driving motor for the turntable is used which can rotate at two speeds. In such a case the two turntables can be assembled directly on the ends of the shaft 12 projecting from the motor and means may be provided which, when the supporting member 4 is swung through 180°, automatically also switch the motor 11 to a different speed.

It will be obvious that a motor which can rotate at two speeds and in which the two turntables are assembled directly on the ends of the shaft 12, may also be used in the arrangement shown in FIG. 1 in which case the pins 9 and 10 may be provided in such a manner that the centre lines of said pins 9 and 10 intersect the centre line of the shaft 12.

When the construction according to the invention is used, the structure of the conventional disc player, for example as described in U.S. Pat. No. 4,218,065, can be substantially maintained since for accommodating the swingable motor with the two turntables, little more space is necessary than is required for accommodating a fixedly arranged motor with turntable in the conventional disc player so that, while maintaining all the possibilities and advantages of the conventional disc player, the disc player nevertheless can be used in a simple manner for different types of discs.

It is to be noted that the construction according to the invention is particularly suitable for performing a small tilt of the turntable in the operating condition in order to correct for the lopsided position of a disc on the turntable in question.

What is claimed is:

1. A disc player comprising
a supporting member which can be swung about a swing axis between a first position and a second position,
a drive motor mounted on said supporting member,
a first turntable drivable by said motor and having a first axis of rotation, said first turntable being mounted on said supporting member so that when said supporting member is in the first position, a disc supported on said first turntable will be in the play position,
a second turntable drivable by said motor and having a second axis of rotation spaced from and parallel to said first axis of rotation, said second turntable being mounted on said supporting member so that when said suppoorting member is in the second position, a disc supported on said second turntable will be in the play position.

2. A disc player as claimed in claim 1, characterized in that the supporting member can be swung through 180° between the first and the second positions.

3. A disc player as claimed in claim 2, characterized in that one of the turntables is connected directly to the motor shaft while the other turntable can be rotated about an axis of rotation extending parallel to the motor shaft and is coupled to the motor shaft via a transmission mechanism.

4. A disc player as claimed in claim 3, characterized in that the supporting member with the motor and turntables can be rotated about a swing axis which extends at right angles to the plane through the axis of rotation of the two turntables and, viewed in the longitudinal direction of the swing axis, is situated centrally between the two axes of rotation of the turntables.

5. A disc player as claimed in claim 4, characterized in that the swing axis is furthermore situated centrally between the disc supporting surfaces of the turntables.

6. A disc player as claimed in claim 3, characterized in that the supporting member with the motor and the turntables can be swung about a swing axis which is situated in the plane through the axes of rotation of the turntables and extends at right angles to said axes of rotation.

7. A disc player as claimed in claim 6, characterized in that the supporting member can furthermore be moved parallel to the swing axis over a distance which is equal to the distance between the axes of rotation of the turntables.

* * * * *